(12) United States Patent
Moorti et al.

(10) Patent No.: US 7,792,227 B2
(45) Date of Patent: Sep. 7, 2010

(54) CARRIER DETECTION FOR MULTIPLE RECEIVER SYSTEMS

(75) Inventors: R. Tushar Moorti, Mountain View, CA (US); Rohit V. Gaikwad, San Diego, CA (US); Amit G. Bagchi, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1449 days.

(21) Appl. No.: 11/132,939

(22) Filed: May 19, 2005

(65) Prior Publication Data

US 2006/0198477 A1    Sep. 7, 2006

Related U.S. Application Data

(60) Provisional application No. 60/657,911, filed on Mar. 2, 2005.

(51) Int. Cl.
*H04L 1/02* (2006.01)
(52) U.S. Cl. .............. 375/347; 375/267; 375/299; 455/132; 455/296
(58) Field of Classification Search ............. 375/267, 375/299, 347
See application file for complete search history.

(56) References Cited

U.S. PATENT DOCUMENTS

| | | | |
|---|---|---|---|
| 5,563,914 A * | 10/1996 | Sogabe | 375/326 |
| 7,145,959 B2 * | 12/2006 | Harel et al. | 375/267 |
| 7,369,631 B1 * | 5/2008 | Gifford et al. | 375/346 |
| 2002/0177427 A1 * | 11/2002 | Nadgauda et al. | 455/403 |
| 2004/0208254 A1 * | 10/2004 | Lee et al. | 375/260 |
| 2005/0018789 A1 * | 1/2005 | Jia et al. | 375/316 |
| 2005/0152314 A1 * | 7/2005 | Sun et al. | 370/334 |
| 2005/0152317 A1 * | 7/2005 | Awater et al. | 370/338 |
| 2005/0153735 A1 * | 7/2005 | Morioka et al. | 455/553.1 |
| 2006/0002487 A1 * | 1/2006 | Kriedte et al. | 375/267 |
| 2006/0050800 A1 * | 3/2006 | Aytur et al. | 375/260 |
| 2007/0098103 A1 * | 5/2007 | Murakami et al. | 375/267 |
| 2008/0130674 A1 * | 6/2008 | Ahmed-Ouameur et al. | 370/441 |

* cited by examiner

*Primary Examiner*—Shuwang Liu
*Assistant Examiner*—Kenneth Lam
(74) *Attorney, Agent, or Firm*—Garlick Harrison & Markison; Robert A. McLauchian, III; Shayne X. Short

(57) ABSTRACT

The present invention provides a method for carrier detection associated with the receipt of MIMO RF packet communications. This involves receiving multiple MIMO RF packet communications with multiple receiver pathways, wherein the RF packet communications each comprise a preamble and data. The RF packet communications are sampled by a carrier detector before, during or after conversion to baseband. The carrier detectors are used to produce a set of carrier detection metrics for each reception pathway. These carrier detection metrics may be combined arithmetically with those of other reception pathways to produce a multi-reception pathway carrier detect. Alternatively, these carrier detection metrics can be processed to produce a logical decision or binary detection signal value associated with each reception pathway, which is then logically combined with the logical decisions of other reception pathways to produce a multi-reception pathway carrier detect.

23 Claims, 16 Drawing Sheets

CARRIER DETECTION FOR MULTIPLE RECEIVER SYSTEMS

CROSS REFERENCES TO RELATED APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 60/657,911, entitled "Carrier detection for multiple receiver systems," filed Mar. 2, 2005.

INCORPORATION BY REFERENCE

The present U.S. Utility Patent Application is related to the following U.S. Utility Patent Applications which are hereby incorporated herein by reference in their entirety and made part of the present U.S. Utility Patent Application for all purposes:

1. U.S. Utility patent application Ser. No. 11/132,777, entitled "Gain estimation for multiple receiver systems," filed May 19, 2005, pending.

2. U.S. Utility patent application Ser. No. 10/810,405, entitled "Method and system for improving dynamic range for communication systems using upstream analog information," filed Mar. 26, 2004, now U.S. Pat. No. 7,257,383, issued on Aug. 14, 2007.

BACKGROUND OF THE INVENTION

1. Field of the Invention

This invention generally relates to wireless communication systems; and more particularly, to performing carrier detection within such communication systems.

2. Background of the Invention

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages unless direct conversion is employed, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). When discussing both SIMO and MIMO communications systems, these communication systems may be collectively referred to as multiple-output radio frequency (MORF) wireless communications. In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

One problem associated with MIMO wireless communications deals with the differing power levels associated with the diverse paths. For example, within a SISO communication system, diversity antennas may be selected to improve the power level associated with the received signal. In a SISO wireless communication system, the antenna may be selected based on the received power level. Within a MIMO system using single or multiple antennas, the differing signal paths may result in differing power levels associated with the multiple received communications.

Another problem associated with MIMO communication systems is the division of received communications over multiple reception pathways. By dividing incoming packets across multiple reception pathways, each active reception pathways receives only a portion of the MIMO streams. The active reception pathways associated with these streams must be identified so that the streams can be combined to recover the MIMO communications.

Additionally, it would be desirable to use one or more types of wireless communications (e.g., SISO, MISO, SIMO, and MIMO), to enhance data throughput within a WLAN. For example, high data rates can be achieved with MIMO communications in comparison to SISO communications. However, the differing power levels on the multiple received communications must be addresses in order to effectively use this technology to achieve enhanced data rates.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

DETAILED DESCRIPTION OF THE INVENTION

Figure 1:
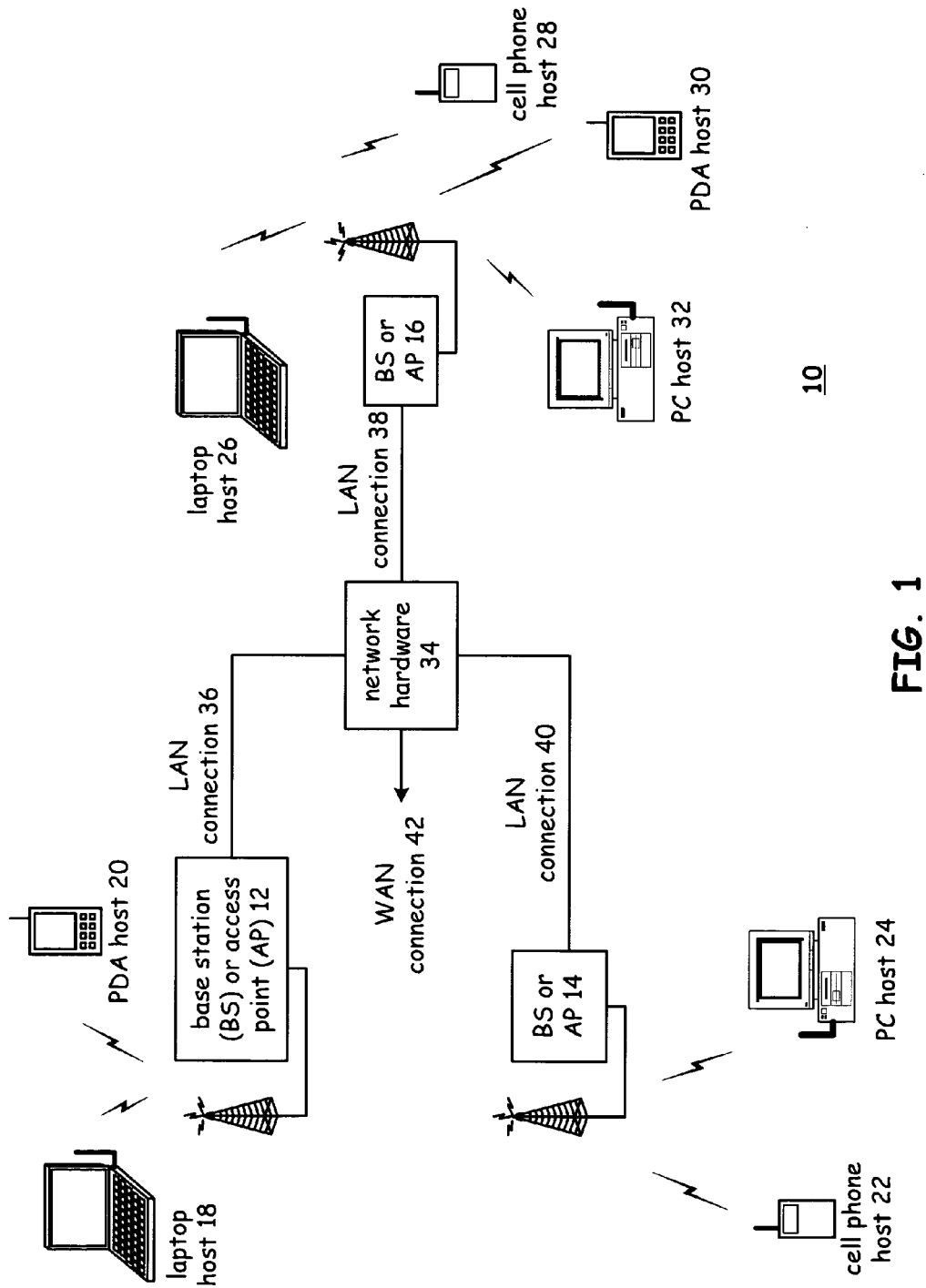
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera, provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
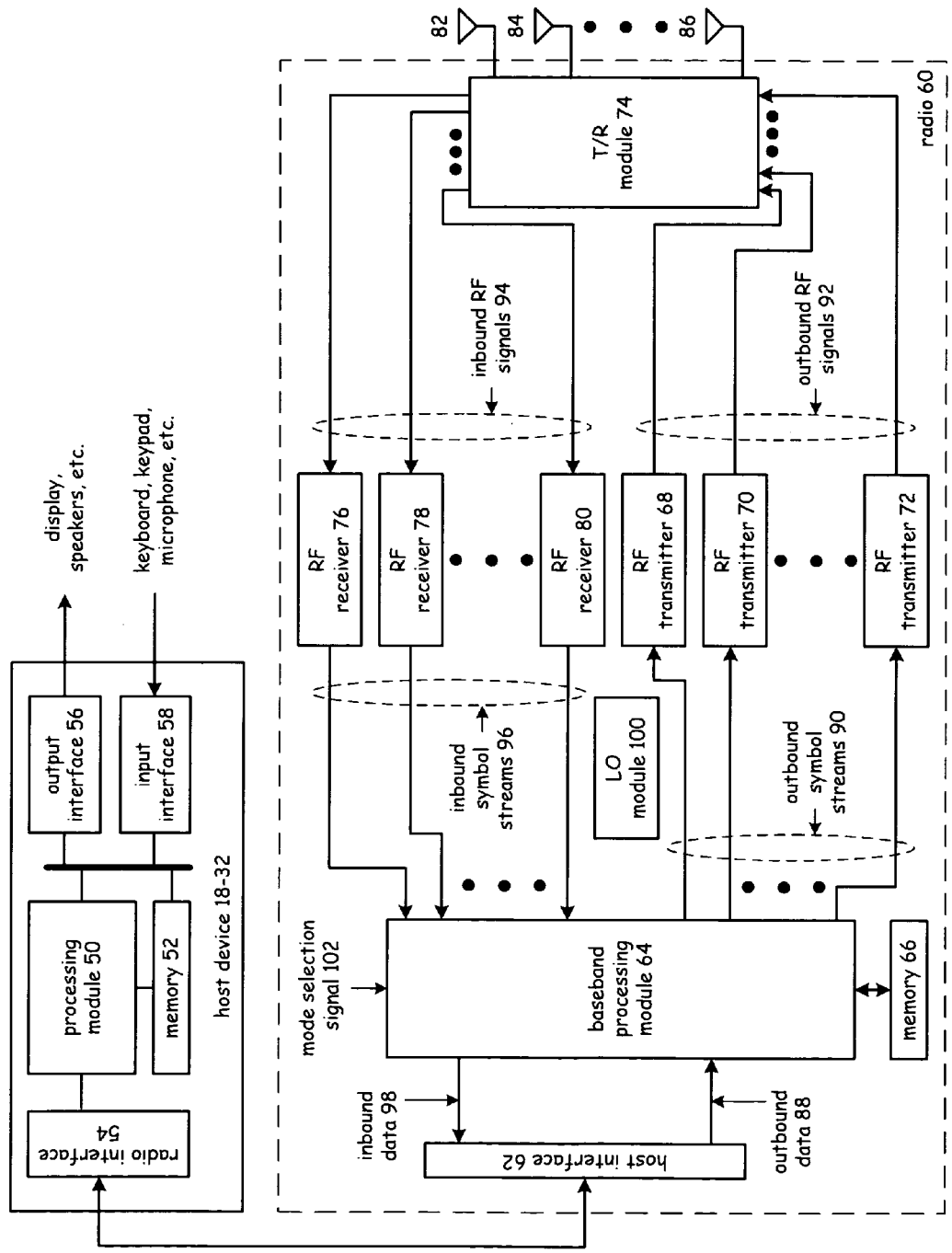
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 6B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to FIGS. 5A-5B, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode. For example, the mode selection signal 102, may indicate a specific frequency band, channel bandwidth, and maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. A code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode. The mode select signal may further indicate a power spectral density mask value. The mode select signal may alternatively indicate rates for alternative frequency bands, channel bandwidth and a maximum bit rate. A number of antennas may be utilized to achieve the higher bandwidths. In such an instance, the mode select would further indicate the number of antennas to be utilized.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received. The baseband processing module 60 receives the inbound symbol streams 90 and converts them into inbound data 98, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
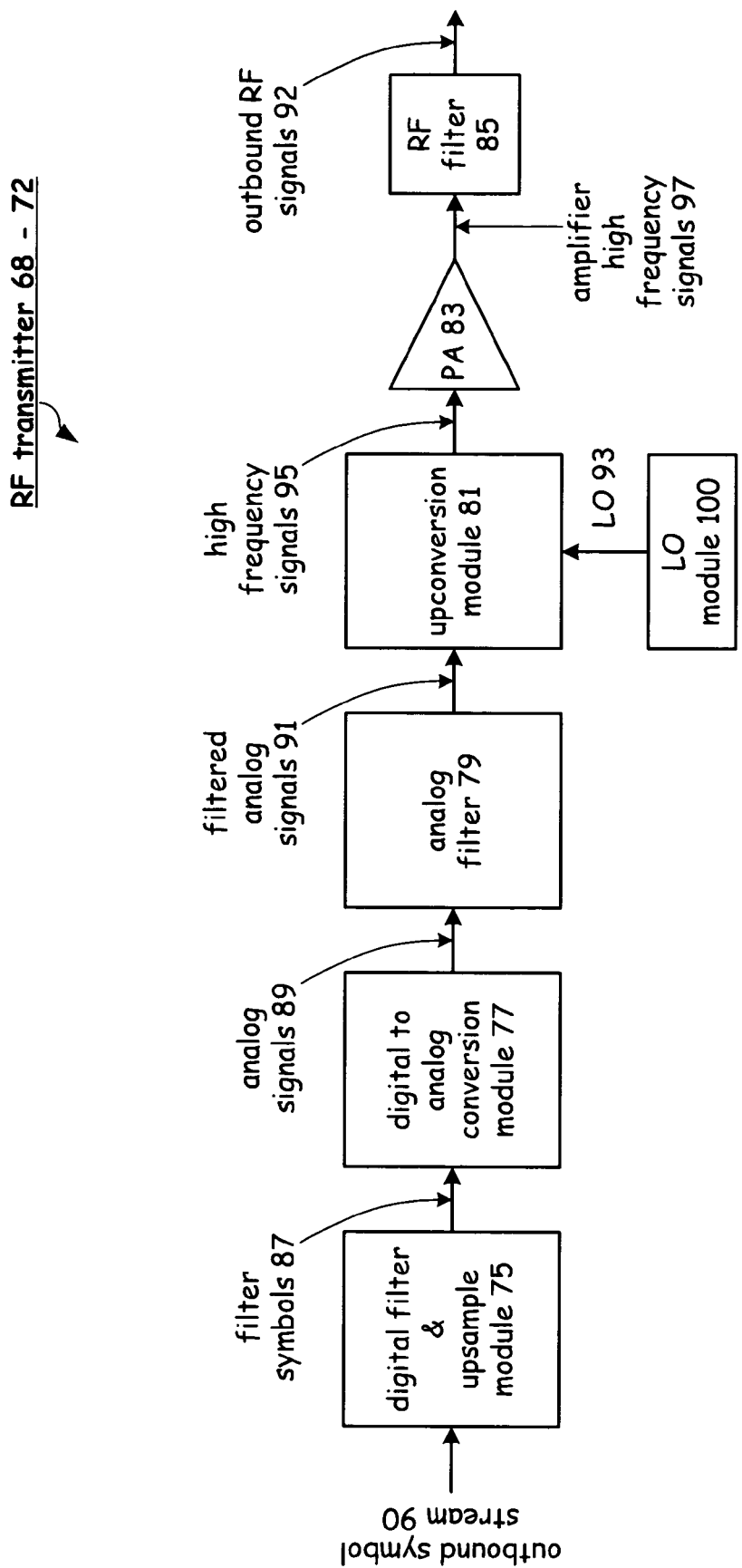
FIG. 3 is a schematic block diagram of an RF transmitter in accordance with the present invention.

FIG. 3 is a schematic block diagram of an embodiment of an RF transmitter 68-72. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
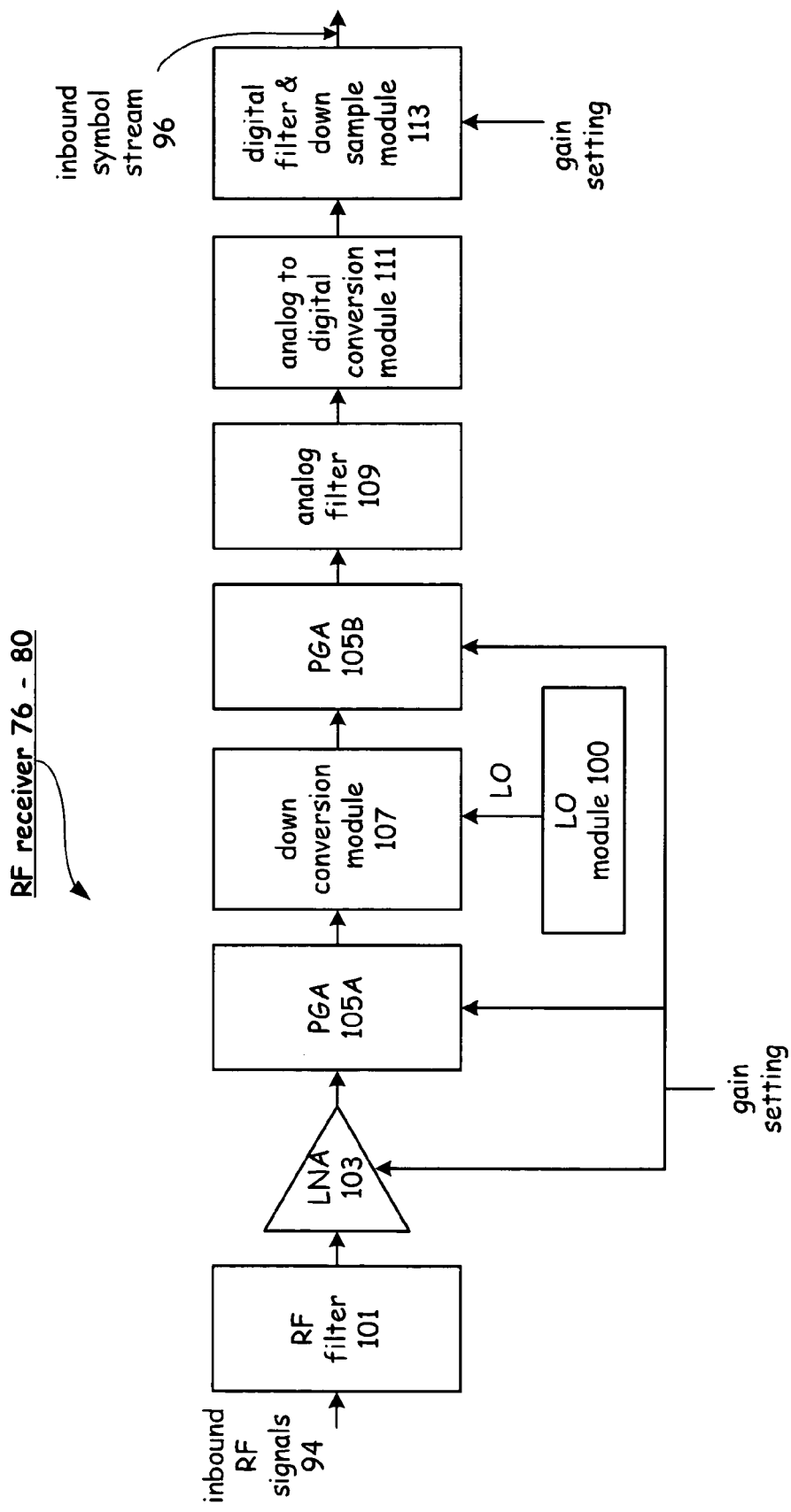
FIG. 4 is a schematic block diagram of an RF receiver in accordance with the present invention.

FIG. 4 is a schematic block diagram of each of the RF receivers 76-80. In this embodiment, each of the RF receivers 76-80 includes an RF filter 101, a low noise amplifier (LNA) 103, programmable gain amplifier(s) (PGA) 105A and 105B, a down-conversion module 107, an analog filter 109, an analog-to-digital conversion (ADC) module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105A. The programmable gain amplifier further amplifies the inbound RF signals 94 before providing them to the down-conversion module 107. An additional programmable gain amplifier 105B may be located downstream of down-conversion module 107. Other embodiments may choose to have either programmable gain amplifier 105A or programmable gain amplifier 105B, but not necessarily both programmable gain amplifiers.

Dynamic range of the received signals may be improved using upstream analog information. A narrow band direct out (NBDO) signal and/or wideband received signal strength indicator (WRSSI) aided automatic gain control (NBDO/WRSSI-aided AGC) which observes the received input signal within the stages of analog processing may be used to determine the gain settings applied to LNA 103 and PGA 105. Digital samples of NBDO information may be utilized to determine a more accurate gain to be applied in order to provide a more accurate calculation of the received signal power strength during the analog processing stage. Accordingly, a wide range in the received input powers may be more efficiently and accurately demodulated.

The gain setting which is to be applied may be determined as a coarse estimate, at least initially, by observing a received signal before the signal reaches an analog to digital converter (ADC) 111. In other words, upstream analog information may be utilized to determine an optimal gain that should be applied to the received signal. This may be enhanced by examining the training preamble of the received signal with the outputs of ADC 111. Digital samples of narrowband direct out (NBDO) information generated by low pass filtering the received signal may be utilized to provide a more accurate calculation of the strength received signal power in the analog processing stage. Accordingly, after applying the initial coarse estimate of the gain, the range of received input powers that may be correctly demodulated may be improved by further refinements of the desired gain setting based on additional training sequences within the communication such as long training sequences (channel sounding) and/or additional short training sequences.

Inbound RF signal 94 then mixes with an input from LO module 100 to generate a baseband signal. The resulting baseband signal may be referred to as a wideband received signal (WRS) and an indication of its signal strength may be referred to as a wideband received signal strength indicator (WRSSI). The resulting baseband signal is filtered by analog filter 109. To generate a narrowband signal which may be referred to as a first narrowband direct output (NBDO-1) signal.

In the analog processing chain of FIG. 4 and the PGA of FIG. 6, an overall gain G may be applied in a plurality of gain stages within PGA 105. For example, the analog section may comprise n stages, each of which applies a corresponding gain $G_1$, $G_2$, ..., $G_N$ (dB) respectively. Accordingly, the overall gain G is given by:

$$G = G_1 + G_2 + \ldots + G_N.$$

Each of gain control blocks applies a gain G to a narrowband direct signal that it receives. In this regard, the gain control block 406a applies an initial gain $G_1$ dB to the first narrowband signal NBDO-1 and generates an analog second narrowband signal NBDO-2. The gain control block 406b applies a gain $G_2$ dB to the second narrowband signal NBDO-2 and generates an analog narrowband signal NBDO-3, and so on. The gain control block 406(n) applies a gain $G_{n-1}$ dB to the $n^{th}$ narrowband signal NBDO-n, the latter of which is provided as an input to the ADC 111. ADC 111 converts the analog signal to digital samples, which are subsequently processed. The digital filter and down-sampling module 113 filters the digital signals and then adjusts the sampling rate to produce the inbound symbol stream 96.

In order to detect small receiver signal inputs, the overall initial gain $G_{initial}$ may be set to a large value. However, if the incoming input signal is itself large, then the overall signal seen at the output of the ADC 111 may be large enough such that clipping will occur at ADC 111, and thus the output of the ADC will not provide reliable information of the signal strength. This may be evidenced by the inability to properly read the first training preamble. In this case, it may not be possible to use the output of the ADC to determine an appropriate final gain $G_{final}$ to be applied to the data portion of the packet. However, knowledge of the unreliable training preamble may be used to adjust the initial gain. To address this issue, if the outputs of the intermediate stages of the analog processing chain are available, for example, WRSSI, NBDO-1, NBDO-2, then these outputs offer an earlier view of the signal before it reaches the ADC. The signals which are earlier in the processing chain will necessarily be smaller and will not be already clipped. If the gains $G_1, G_2, \ldots, G_n$ are known, it is possible to narrow down a range within which the input signal lies.

Figure 5A:
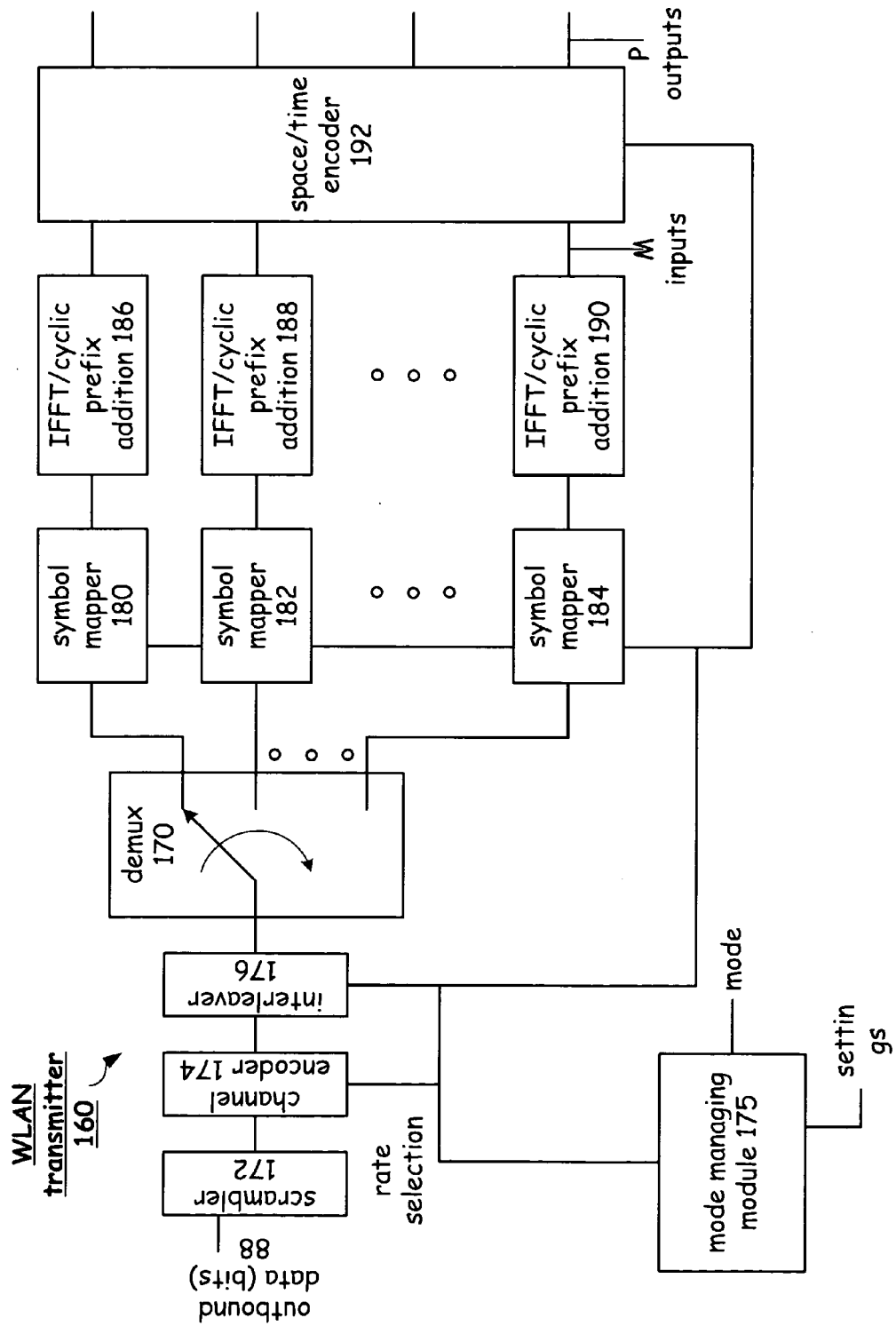
FIGS. 5A and 5B are a schematic block diagram of a radio transmitter in accordance with the present invention.
Figure 5B:
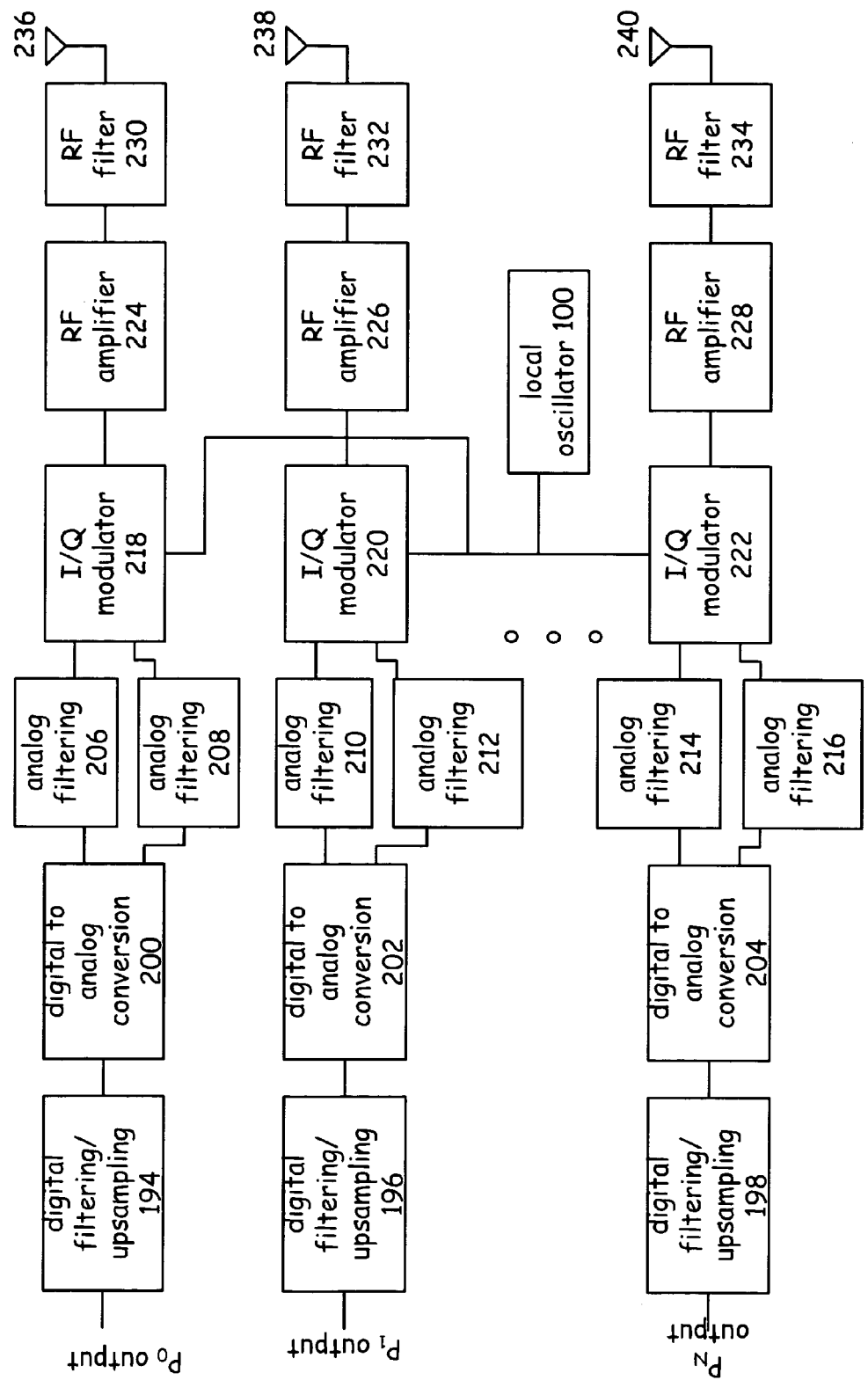

FIGS. 5A and 5B illustrate a schematic block diagram of a multiple transmitter. In FIG. 5A, the baseband processing is shown to include a scrambler 172, channel encoder 174, interleaver 176, demultiplexer 178, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal and produces settings for the radio transmitter portion and produces the rate selection for the baseband portion.

In operations, the scrambler 172 adds (in GF2) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔rds and ¾ according to the specified rate. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal.

Interleaver 176 receives the encoded data and spreads the data over multiple symbols and transmit streams. This allows improved detection and error correction capabilities at the receiver. In one embodiment, the interleaver 176 will follow the IEEE 802.11(a) or (g) standard in the backward compatible modes. For higher performance modes, the interleaver will interleave data over multiple transmit streams. The demultiplexer 178 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to a rate tables. For IEEE 802.11(a) backward compatibility, double gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined by the mode tables. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal M+1 paths. For each of the paths, the space/time encoder multiples the input symbols with an encoding matrix that has the form of $$\begin{bmatrix} C_1 & C_2 & C_3 & \cdots & C_{2M-1} \\ -C_2^* & C_1^* & C_4 & \cdots & C_{2M} \end{bmatrix}$$

Note that the rows of the encoding matrix correspond to the number of input paths and the columns correspond to the number of output paths.

FIG. 5B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennas 236-240. The P-outputs from the space/time encoder 192 are received by respective digital filtering/up-sampling modules 194-198.

In operation, the number of radio paths that are active correspond to the number of P-outputs. For example, if only one P-output path is generated, only one of the radio transmitter paths will be active. As one of average skill in the art will appreciate, the number of output paths may range from one to any desired number. Furthermore, the channel conditions with the various output paths may vary resulting in varying gains that will be discussed in further detail in FIG. 6 and following.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 208-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals. The RF amplifiers 224-228 amplify the RF signals which are then subsequently filtered via RF filters 230-234 before being transmitted via antennas 236-240.

Figure 6A:
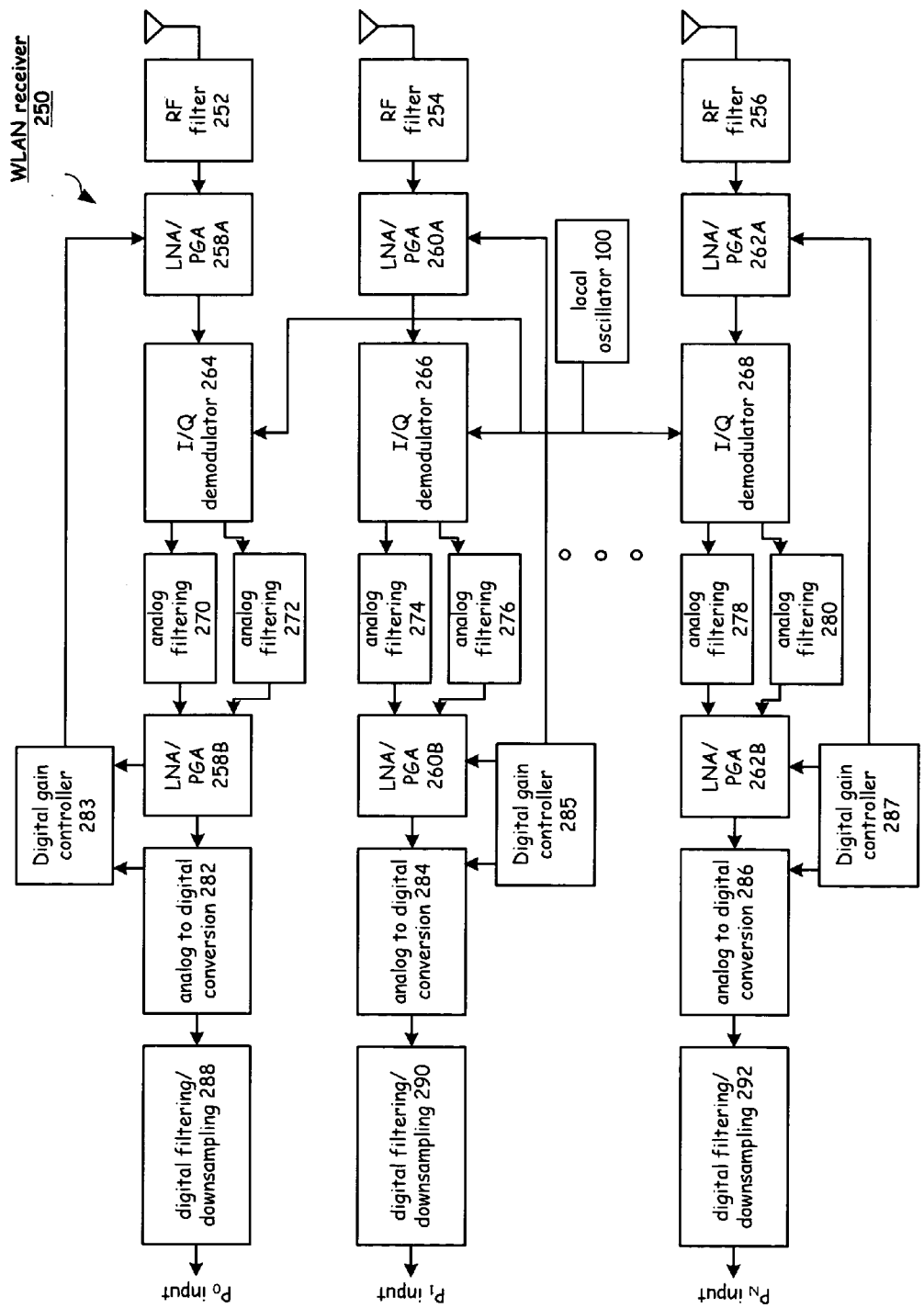
FIGS. 6A and 6B are a schematic block diagram of a radio receiver in accordance with the present invention.
Figure 6B:
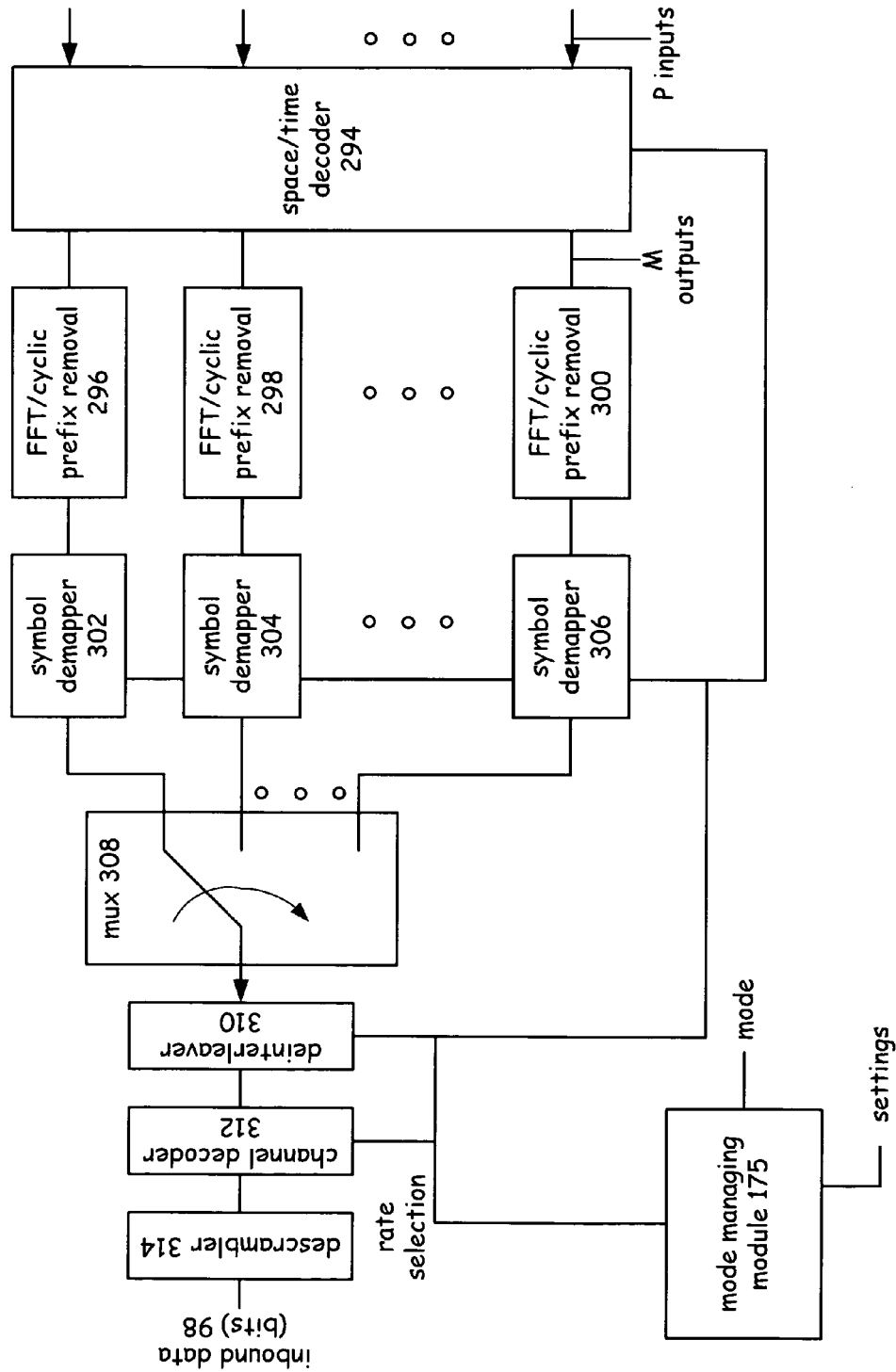

FIGS. 6A and 6B illustrate a schematic block diagram of a MIMO receiver in accordance with an embodiment of the present invention. The receiver may be part of a packet-based wireless system, which may be adapted to receive a signal that is transmitted at a particular carrier frequency. FIG. 6A illustrates the analog portion of the receiver which includes a plurality of receiver paths. Each receiver path includes an antenna, RF filters 252-256, low noise amplifiers and programmable gain amplifiers 258-260, I/Q demodulators 264-268, analog filters 270-280, analog-to-digital converters 282-286 and digital filters and down-sampling modules 288-290.

In operation, the antennas receive inbound RF signals, which are band-pass filtered via the RF filters 252-256. The corresponding low noise amplifiers and programmable gain amplifiers 258A, 260A, and 262A amplify the filtered signals and provide them to the corresponding I/Q demodulators

264-268. The I/Q demodulators 264-268, based on a local oscillation, which is produced by local oscillator 100, down-converts the RF signals into intermediate frequency (IF) or directly to baseband in-phase and quadrature analog signals. The resulting baseband signal may be referred to as a wideband received signal (WRS) and an indication of its signal strength may be referred to as a wideband received signal strength indicator (WRSSI). The resulting baseband signal is filtered by the analog filters 270-280 to generate a narrowband signal which may be referred to as a first narrowband direct output (NBDO-1) signal.

Low noise amplifiers and programmable gain amplifiers 258A and 258B, 260A and 260B, and 262A and 262B may use an initial coarse estimate of the desired gain obtained from the first training preamble provided by ADC 282-286 as well analog information from those components upstream of ADC 282-286. This coarse estimate may initially be the same for each receiver. However, the differing channels conditions associated with each path may cause the gain to differ. Further, interference between paths may cause the gain to differ over time dependent on the interaction of the multiple paths and the channel conditions. Although low noise amplifiers and programmable gain amplifiers are depicted immediately upstream of both the I/Q demodulators 264-268 and ADC 282-286, other embodiments may select either low noise amplifiers and programmable gain amplifiers 258A, 260A, and 262A or low noise amplifiers and programmable gain amplifiers 258B, 260B, and 262B but not necessarily both low noise amplifiers and programmable gain amplifiers.

Figure 7:
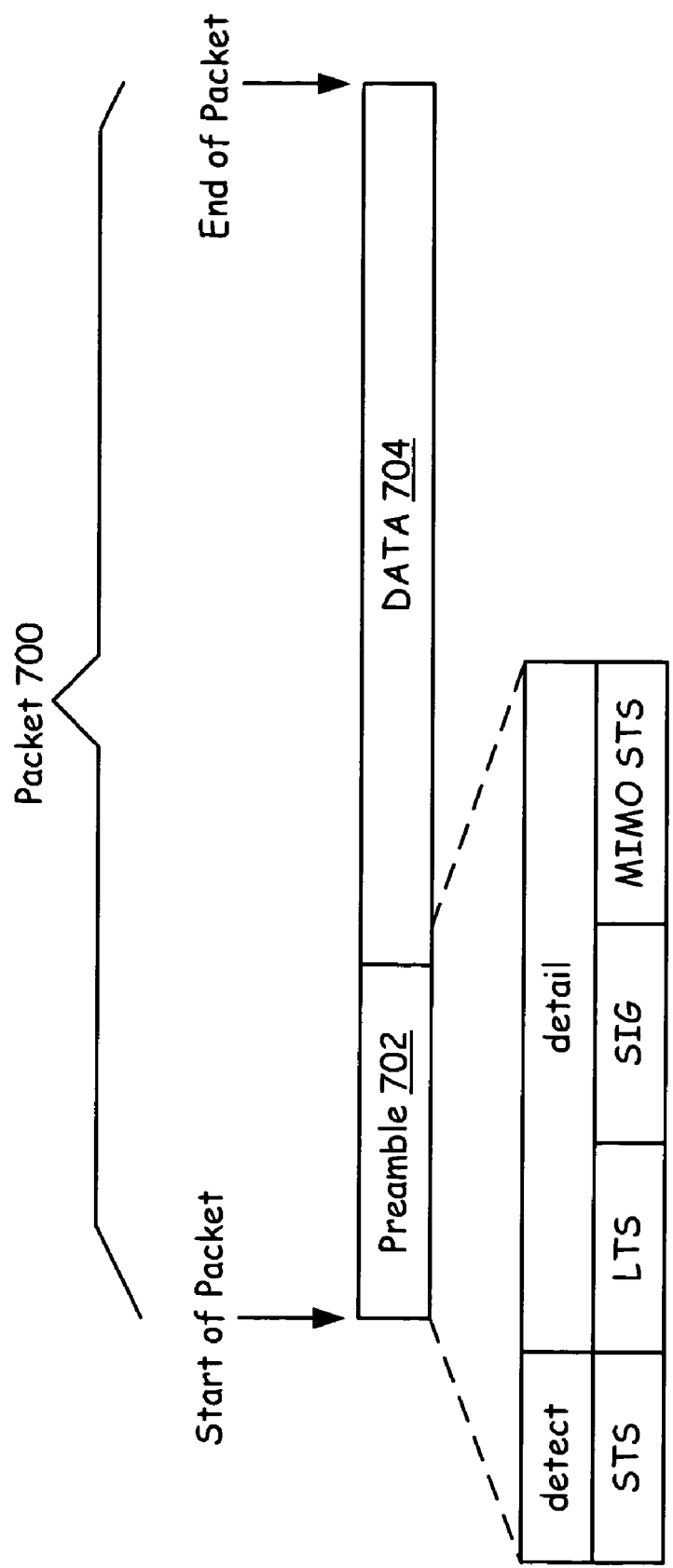
FIG. 7 is a diagram of the basic structure of received RF communication packets in a MIMO communication system.

For 802.11 orthogonal frequency division multiplexing (OFDM) systems, the gain $G_{final}$ is calculated and applied during the preamble portion of the packet. Such as packet is illustrated in FIG. 7. Packet 700 has a preamble portion 702 and a data portion 704. The leftmost portion of the packet 700 is the demarcation of the start of packet (SOP) and the rightmost portion of the packet 700 is the demarcation of the end-of-packet EOP. The preamble of the packet is relatively short in time compared to the overall packet length, and corrections for other system impairments such as frequency offset may also need to be calculated during this portion of the transmission. Thus, the amount of time needed to determine the proper gain setting for the received packet needs to be kept small. For a practical 802.11a/g orthogonal frequency division multiplexing system, this means preferable one intermediate gain setting $G_{intermediate}$ is allowed during the preamble to determine the final gain $G_{final}$. The preamble may be divided into several training sequences. For example, first a short training sequence (STS) may be received. This is followed by a long training sequence (LTS), SIG, and an additional short training sequence (STS). The SIG portion of the preamble may describe the content of data 704 with information provided in a predetermined format. The additional training sequences allow the packet gain to be adjusted prior to the receipt of data based on the signal strength and processing of a valid training sequence. Thus additional training sequences allow fine adjustments to be made with reduced interference. Other adjustments may be made to the gain control during packet data.

Figure 8:
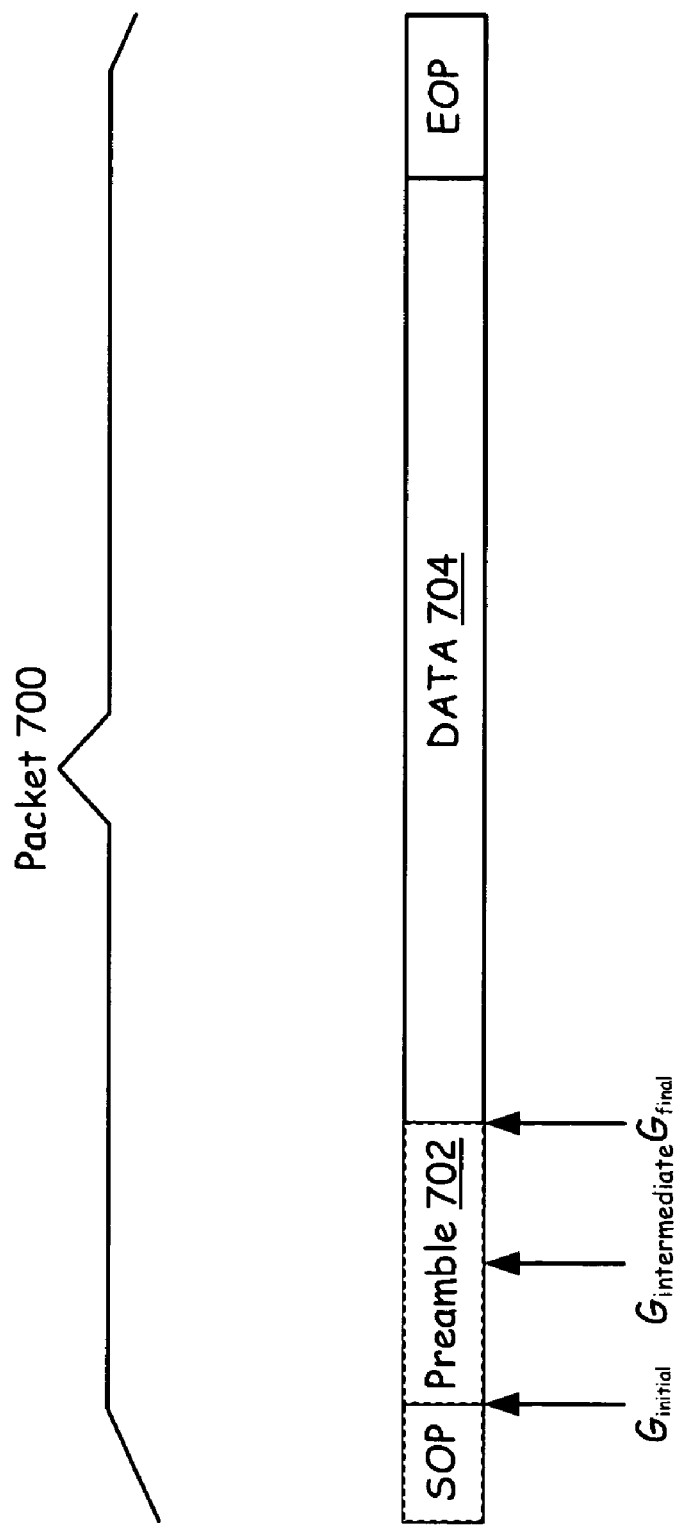
FIG. 8 is a diagram of the basic structure of received RF communication packets in a MIMO communication system and when various gains are applied to the received RF communication packet.

FIG. 8 illustrates the application of gain to a packet. Referring to FIG. 7, a gain $G_{initial}$ is applied at the start-of-packet (SOP) where clipping is occurring. A gain $G_{intermediate}$ is applied where no clipping occurs but the signal is too small. A gain $G_{final}$ is applied where no clipping occurs and the signal is ideal. In this case, $G_{initial}$, $G_{intermediate}$ and $G_{final}$ are applied during the preamble. Other scenarios may involve applying gains $G_{intermediate}$ and/or $G_{final}$ during the data portion of packet 700.

In order for a receiver to detect small receiver signal input, the initial front-end gain $G_{initial}$ must necessarily be set to a large value. However, if the incoming signal is in fact large, the signal level at the output of the ADC will be clipped, making it difficult to determine the received signal power and recognize the training sequence within the preamble. That is, if a received signal power of X dBm is enough to cause a clip at the ADC, then all received signal powers greater than X dBm also cause a clip.

With the help of these training sequences, the one can eliminate or reduce the intersymbol interferences, which can be caused by propagation time differences of multipath propagation. This is especially true when applied to MIMO where multipath propagation of multiple signals can create additional interference. A number of known training sequences are defined for normal RF bursts. By analyzing the training sequence(s), initially and over time, one can make a coarse estimation of the gain to be applied within the programmable gain amplifier 258-262. Further refinement of the gain may be performed over time using additional training sequences within later RF packet communications. This may be required by interference between multiple RF packet communications. The long training sequence and MIMO short training sequence of FIG. 7 may help successive refinement of the gain.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 6B.

FIG. 6B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 9:
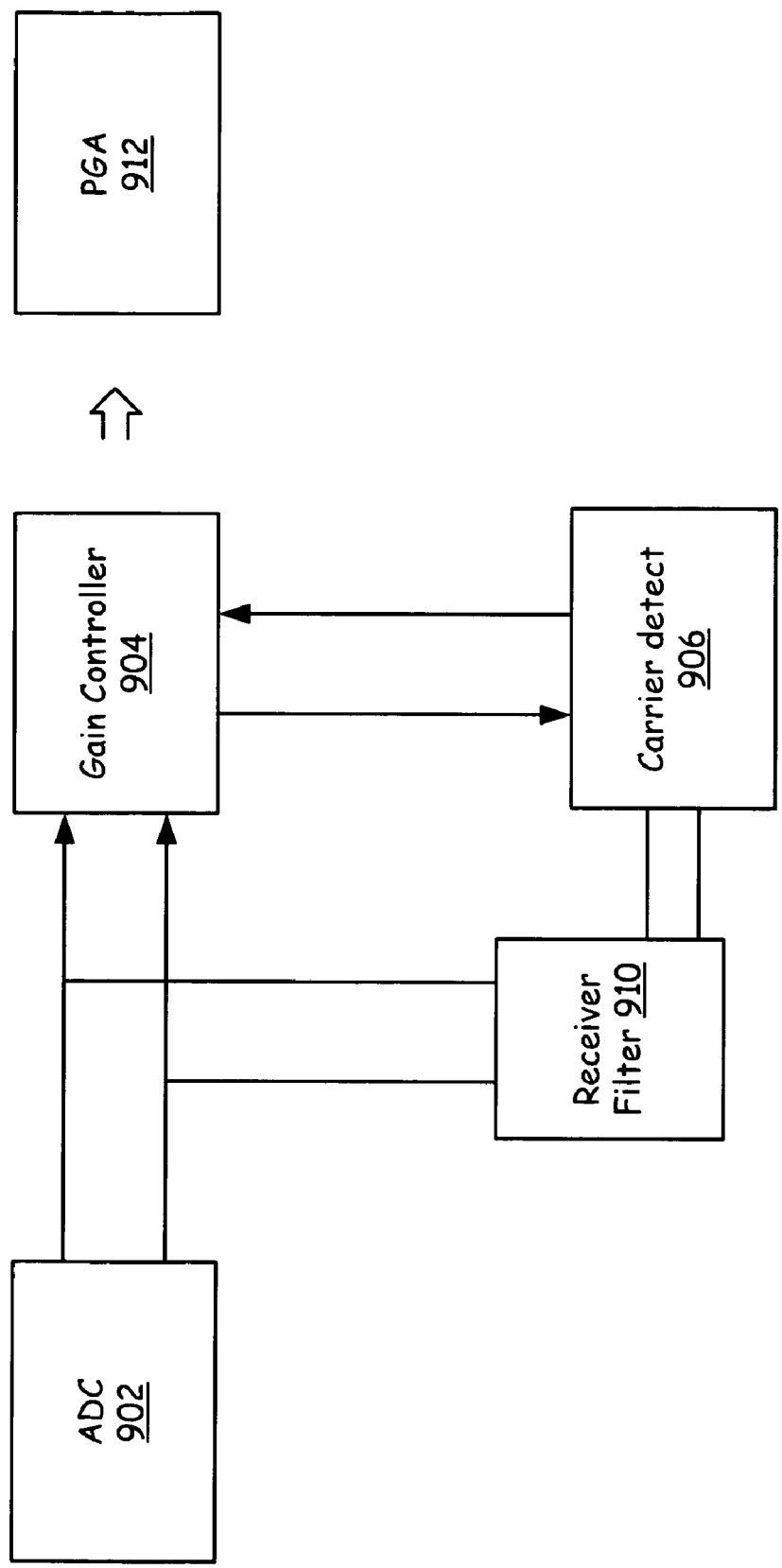
FIG. 9 is a schematic block diagram of a automatic gain controller using outputs of an ADC in accordance with an embodiment of the present invention.

FIG. 9 illustrates a digital gain controller operable to receive inputs from an ADC and produce inputs to the programmable gain amplifier. Here ADC 902 produces output signals which are in turn are received by gain controller 904. This gain controller may determine whether or not a coarse adjust of the gain is needed. This may involve determining whether or not a dynamic range clipping occurred or a received signal. Should dynamic range clipping have occurred it may become necessary to determine whether or not an actual signal was received. When dynamic range clipping potentially occurs, a carrier detector may be employed to determine whether or not dynamic range clipping in fact occurred based on whether or not a carrier had in fact been detected. Carrier detect module 906 is operable to determine whether or not a carrier was in fact present. Should the carrier have been present then a coarse gain adjustment is to be applied. Receiver filter 910 provides inputs to carrier detect module 906 and are used to determine whether or not a carrier signal is present. Receiver filter 910 may include DC filter components. Such components may be required where the direct conversion to baseband occurs. Other scenarios known to those having skill in the art may include other like filter components. The gain controller is then able to provide an input control signal to the programmable gain amplifier 912 based on the outputs of the analog to digital converter.

Figure 10:
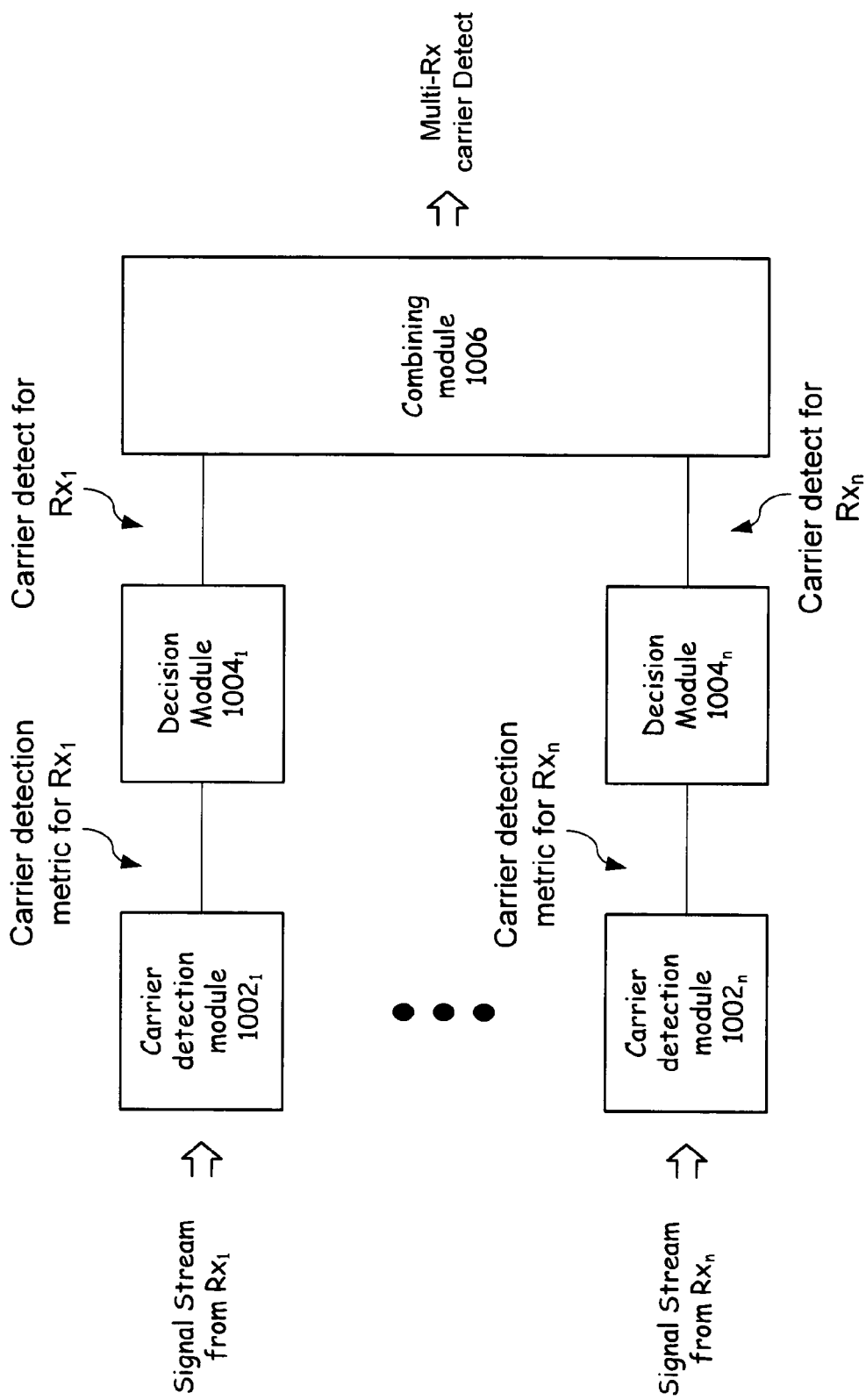
FIG. 10 is a functional block diagram of MIMO carrier detector in accordance with an embodiment of the present invention.

FIG. 10 provides a functional block diagram of a carrier detection circuit light which may be used for the carrier detect depicted in FIG. 9. Here, a signal stream is received from each reception pathway. This signal stream may be received from the RF signal, IF signal, or a base band signal within the reception pathway. The RF signal may be sampled prior to the demodulator of the MIMO receiver illustrated in FIGS. 6A and 6B. The IF signal may be sampled within the demodulator if a two or more stage demodulation process is used. The baseband signal may be sampled downstream of the demodulators. Additionally, the baseband signal may be sampled as either an analog signal prior to processing the base band signal with the analog digital converter or as a digital signal downstream of the analog to digital converter.

The multiple receiver pathways ($Rx_1$-$Rx_n$) supply an input to a carrier detection module 1002. This carrier detection module may produce carrier detection set of metrics for the received signal. This carrier detection metric may be expressed as a series of metrics or as a binary signal detection value for each reception pathway. These carrier detection metrics may be supplied to a decision module, such as decision module 1004, where the decision module may produce a logical decision or binary signal detection value based on the carrier detection metrics as to whether or not a carrier detect has occurred for that reception pathway. Combining module 1006 receives the multiple carrier detects for the various reception pathways and may use logical operators (such as and, or, or not functions) to create a composite carrier detection signal. As shown previously this carrier detection signal may be used as an input associated with a digital gain controller.

Figure 11:
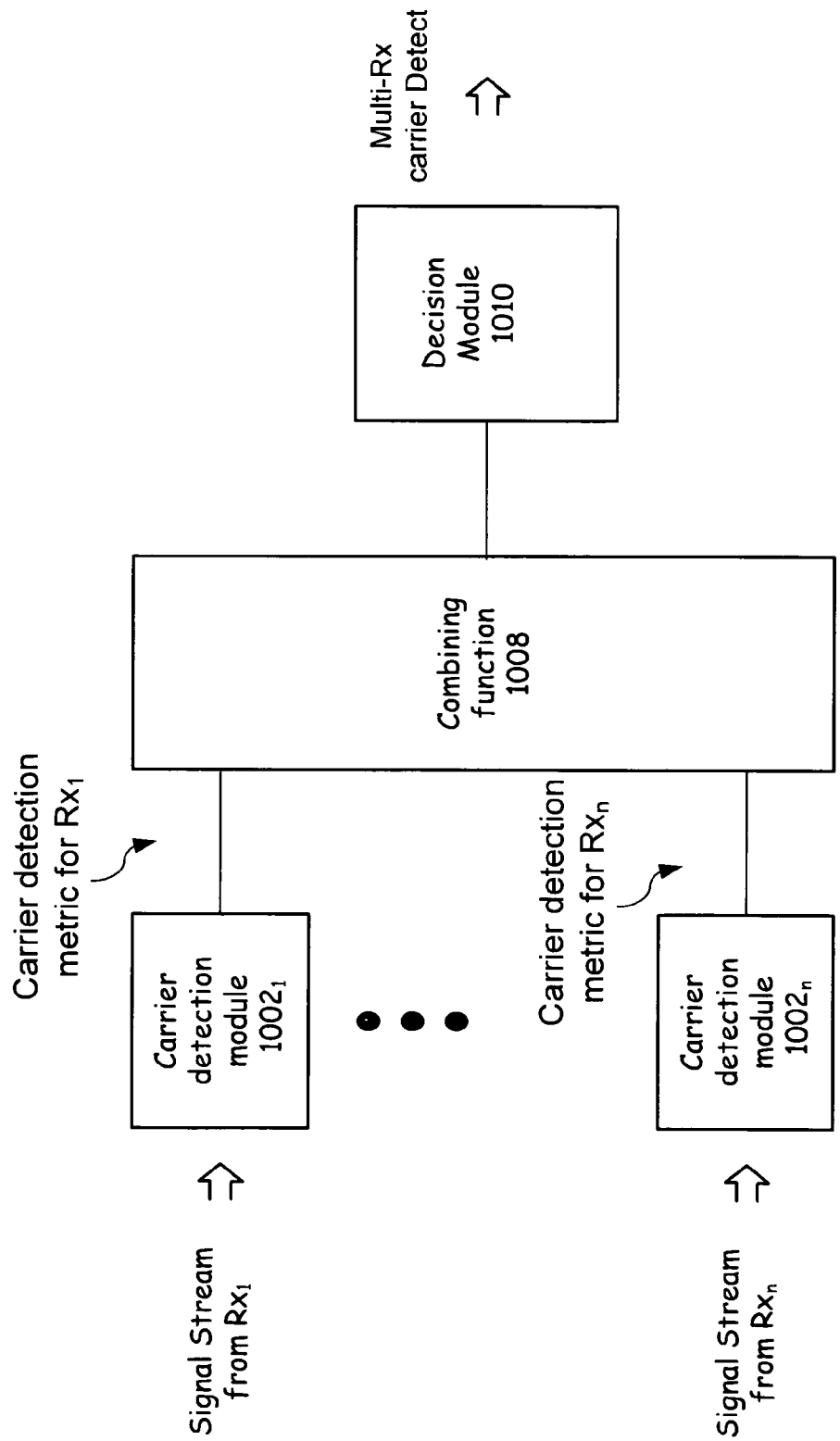
FIG. 11 is a functional block diagram of MIMO carrier detector in accordance with an embodiment of the present invention.

FIG. 11 depicts another functional diagram of a carrier detection circuit for a MIMO communication system. Again, a signal is received from each reception pathway ($Rx_1$-$Rx_n$). This signal may be either an RF signal, IF signal, or a baseband signal. Carrier detection modules 1002 process the received signal to produce a set of carrier detection metrics for the reception pathway. These carrier detection metrics for each reception pathway are combined to form a composite metric by combining function 1008. The combining function 1008 may output the composite metric to a decision module 1010 which then determines whether or not a multi-reception pathway carrier detection has occurred and produces a composite binary signal detection value.

Figure 12:
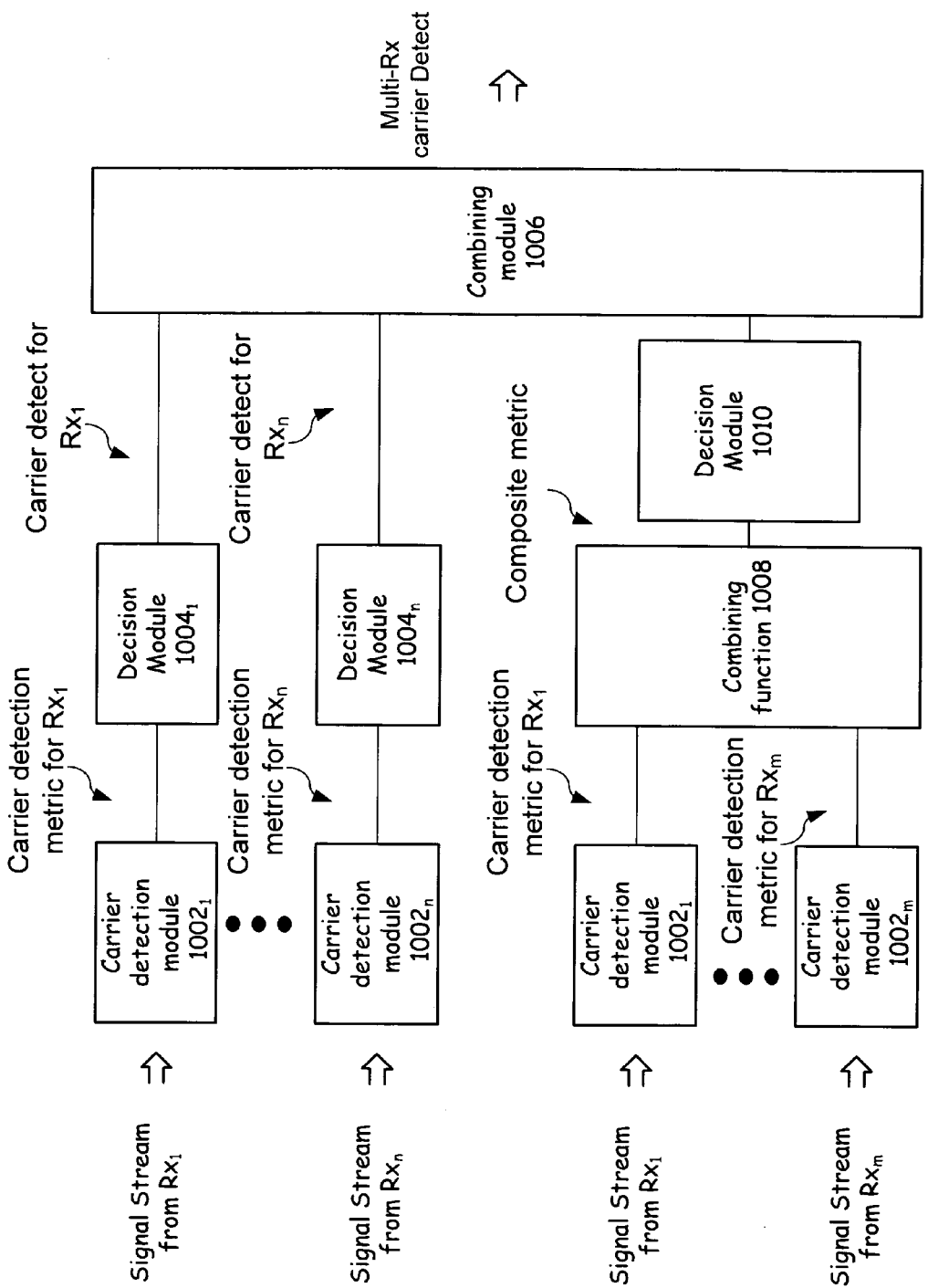
FIG. 12 is a functional block diagram of MIMO carrier detector in accordance with an embodiment of the present invention.

FIG. 12 illustrates a case where both arithmetic and logic combined functions can be performed to determine whether or not a carrier has been detected for the multiple reception pathways. Again, signals are sampled from each reception pathway. These are provided to carrier detection modules 1002 which then produce carrier detection metrics for each pathway. These may be supplied to a decision module such as decision module 1004 to determine whether or not a carrier detect has occurred for that reception pathway. Additionally, the carrier detection metrics may be combined arithmetically with a combining function 1008 to produce a composite metric used by decision module 1010 which is then again provided as an input to combining module 1006 to determine whether or not a carrier detect has occurred for the multiple reception pathways.

Figure 13:
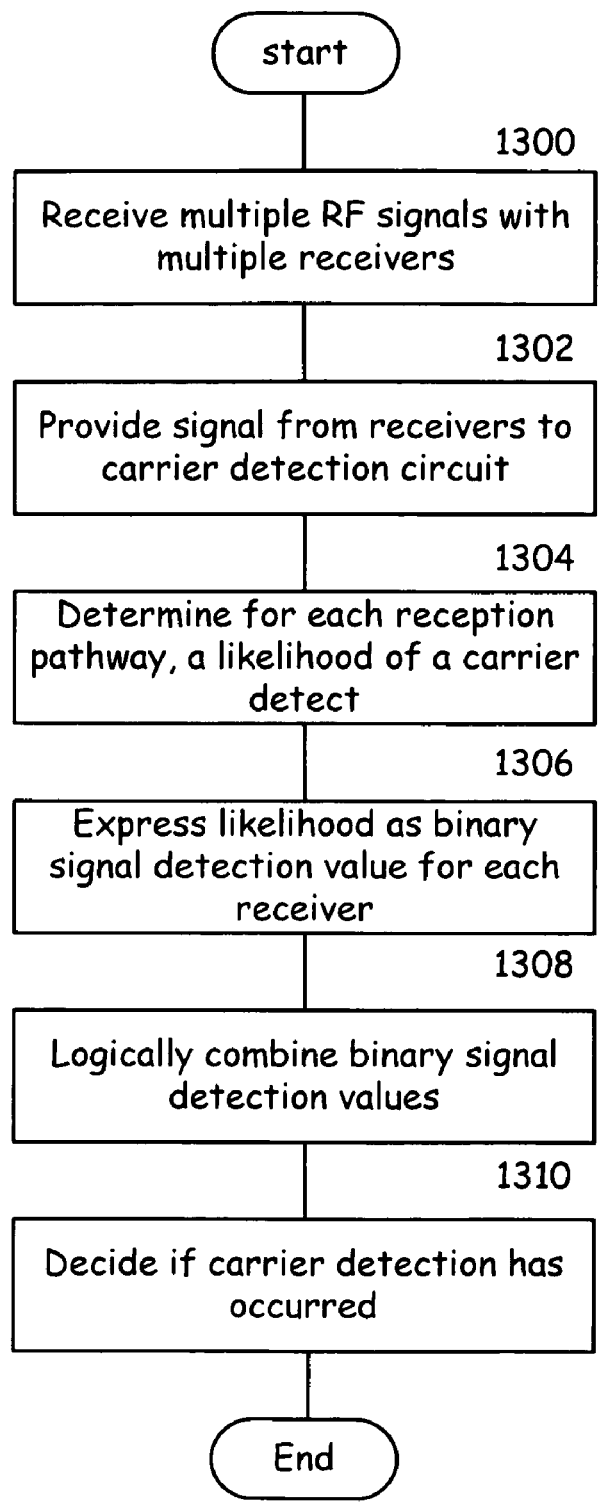
FIG. 13 is a logic flow diagram illustrating MIMO carrier detection in accordance with an embodiment of the present invention.

FIG. 13 is a logic flow diagram illustrating a method of determining whether or not a carrier signal has been detected within the multiple radio frequency reception pathways of a MIMO or SIMO communication system. This involves in step 1300 receiving multiple RF signals which are processed within each reception pathway. The signals are provided to the carrier detection circuits such as those illustrated by the functional block diagrams of FIGS. 10, 11 and 12. The signal provided may be an RF signal, an IF signal, an analog baseband signal, or a digital signal. For each reception pathway, the likelihood that a carrier signal is associated with the reception pathway is determined in step 1304. Step 1306 expresses each likelihood in a binary signal detection value associated with each reception pathway. Such as the case where the detection module 1004 produces a logical carrier detect in FIG. 10. Step 1308 logically combines these binary signal detection value to produce a logical decision in step 1310 as to whether or not a carrier detect has occurred.

Figure 14:
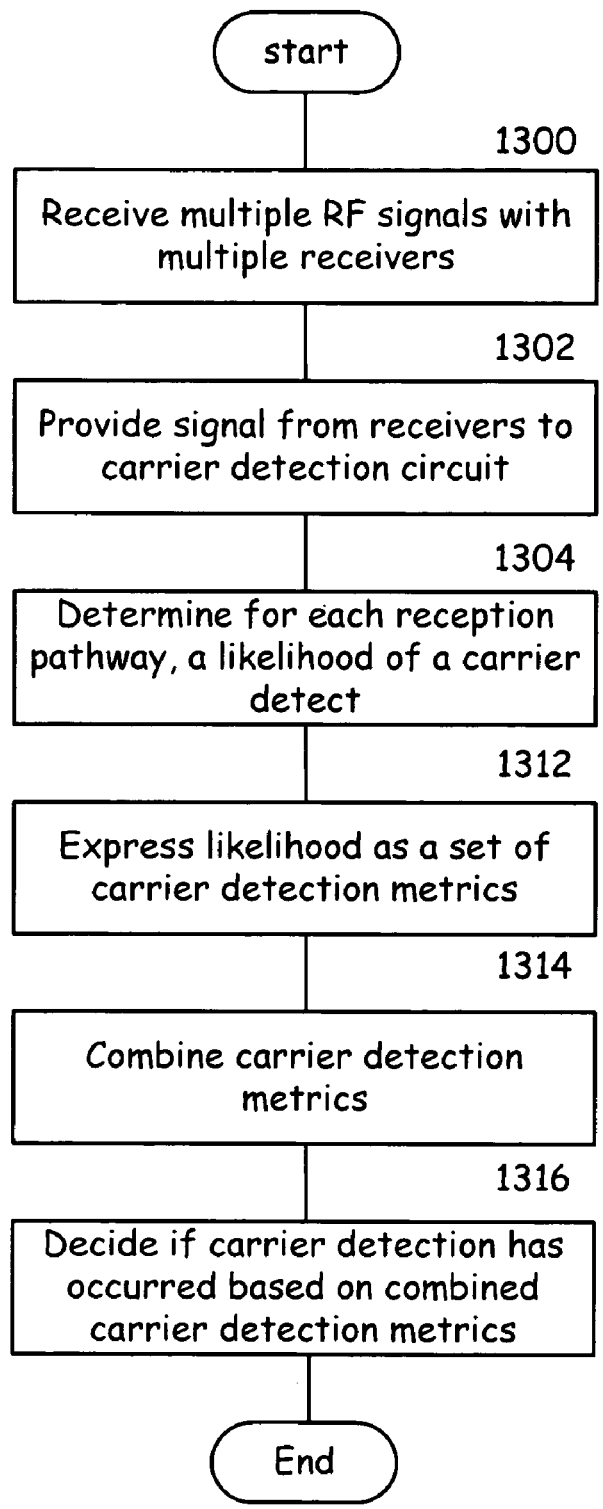
FIG. 14 is a logic flow diagram illustrating MIMO carrier detection in accordance with an embodiment of the present invention.

FIG. 14 provides a logic flow diagram illustrating another method of detecting carrier signals similar to that of FIG. 13. However, after step 1304, the flows differ. Here, each likelihood is expressed as a set of carrier detection metrics in step 1312 immediately following step 1304. This set of carrier detection metrics may be combined arithmetically in step 1314 to produce a set of composite carrier detection metrics. The composite carrier detection metric may be processed by a decision module in step 1316 to decide whether or not carrier detection has occurred. Other embodiments may combine the decision making processes of FIGS. 13 and 14. Such a process would logically combine the logical decisions associated with each reception pathway with the logical decision based on the arithmetically combined set of carrier detection metrics to determine if carrier detection has occurred.

In summary, the present invention provides a method for carrier detection associated with the receipt of MIMO RF packet communications. This involves receiving multiple MIMO RF packet communications with multiple receiver pathways, wherein the RF packet communications each comprise a preamble and data. The RF packet communications are sampled by a carrier detector before, during or after conversion to baseband. The carrier detectors are used to produce a set of carrier detection metrics for each reception pathway. These carrier detection metrics may be combined arithmetically with those of other reception pathways to produce a multi-reception pathway carrier detect. Alternatively, these carrier detection metrics can be processed to produce a logical decision or binary detection signal value associated with each reception pathway, which is then logically combined with the logical decisions of other reception pathways to produce a multi-reception pathway carrier detect. The results of the carrier detect can be used to prevent unnecessary processing within the reception pathways, as inputs to a gain controller or for other purposes as is known to those skilled in the art.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As one of average skill in the art will appreciate, other embodiments may be derived from the teaching of the present invention without deviating from the scope of the claims.

What is claimed is:

1. A method operable to detect carrier signals within multiple radio frequency (RF) reception pathways of a multiple input multiple output (MIMO) communication system, comprising:
   receiving multiple RF signals, wherein a RF signal is processed within each RF reception pathway;
   determining, for each RF reception pathway, a likelihood that a carrier signal is associated with the processed RF signal;
   expressing the likelihood that the carrier signal is associated with the RF signal as a set of carrier detection metrics for each RF reception pathway;
   combining the set of carrier detection metrics for each RF reception pathway to produce a composite metric representing a likelihood that the carrier signal is received by the MIMO communication system; and
   determining that the carrier signal is received by the MIMO communication system based on the composite metric; and wherein:
   determining the likelihood that the carrier signal is associated with the RF signal further comprises:
      determining a binary signal detection value for each RF signal based on the set of carrier detection metrics in order to produce a first set of binary signal detection values;
      combining arithmetically the set of carrier detection metrics for each RF reception pathway to produce the composite metric;
      determining a composite binary signal detection value from the composite metric; and
      logically combining the first set of binary signal detection values with the composite binary signal detection value to produce the carrier detection.

2. The method of claim 1, wherein the RF signal is processed to produce the respective carrier decision metric for each RF reception pathway.

3. The method of claim 1, wherein each RF reception pathway is operable to down convert the RF signal to produce a baseband signal, wherein the baseband signal is processed to produce the respective carrier decision metric for each RF reception pathway.

4. The method of claim 1, wherein:
   the method being performed within a wireless communication device.

5. The method of claim 1 wherein:
   the set of carrier detection metrics for each RF reception pathway are combined arithmetically to produce the composite metric;
   the set of carrier detection metrics for each RF reception pathway are processed to produce a binary signal detection value for each RF reception pathway, and wherein the plurality of binary signal detection values combine logically; and
   the composite metric comprises a logical decision based on the logically combined binary signal detection values and corresponding to carrier detection.

6. The method of claim 1, wherein:
   the method being performed in a base station, an access point, a laptop computer host, a personal computer host, a cellular telephone host, or a personal digital assistant host.

7. A multiple input multiple output (MIMO) radio frequency (RF) receiver operable to receive a MIMO communication comprising a plurality of RF signals, comprising:
   a plurality of RF receiver sections each operable to receive an RF signal and produce a baseband signal;
   a plurality of baseband processing modules operably coupled to the plurality of RF receiver sections, wherein the baseband processing modules are operable to convert the plurality of baseband signals into data when the MIMO communication is a valid packet communication; and
   a carrier detection module operably coupled to the plurality of RF receiver sections, wherein the carrier detection module is operable to:
      determine, for each RF signal, a likelihood that a carrier signal is associated with the RF signal;
      express the likelihood that the carrier signal is associated with the RF signal as a set of carrier detection metrics;
      combine the set of carrier detection metrics for each RF signal to produce a composite metric representing a likelihood that the carrier signal is received; and
      determine that the carrier signal is received based on the composite metric, wherein a received carrier signal is associated with a valid MIMO communication; and wherein:
   the set of carrier detection metrics for each RF reception pathway are processed to produce a binary signal detection value for each RF reception pathway, and wherein the plurality of binary signal detection values combine logically; and
   the composite metric comprises a logical decision based on the logically combined binary signal detection values and corresponding to carrier detection.

8. The MIMO RF receiver of claim 7, wherein the carrier detection module is further operable to:
   determine the likelihood that the carrier signal is associated with the RF signal from the baseband signals;
   determine the likelihood that the carrier signal is associated with the RF signal from an intermediate frequency (IF) signal; or
   determine the likelihood that the carrier signal is associated with the RF signal from the RF signal.

9. The MIMO RF receiver of claim 7, wherein the set of carrier detection metrics for each RF reception pathway are combined arithmetically to produce the composite metric.

10. The MIMO RF receiver of claim 7, wherein:
the MIMO RF receiver being implemented within a base station, an access point, a laptop computer host, a personal computer host, a cellular telephone host, or a personal digital assistant host.

11. The MIMO RF receiver of claim 7, wherein:
the set of carrier detection metrics for each RF reception pathway are processed to produce a binary signal detection value for each RF reception pathway;
the set of carrier detection metrics for each RF reception pathway are combined arithmetically, wherein the arithmetically combined sets of carrier detection metrics are used to produce a composite binary signal detection value; and
the binary signal detection value for each RF reception pathway and composite binary signal detection value combine to produce the carrier detection.

12. The MIMO RF receiver of claim 7, wherein the MIMO RF receiver supports a packet based communication system.

13. The MIMO RF receiver of claim 7, wherein the MIMO RF receiver supports a wireless local area network (WLAN).

14. A carrier detection module for a multiple input multiple output (MIMO) communication system, comprising:
a processing module; and
memory operably coupled to the processing module, wherein the memory stores operational instructions that enable the processing module to:
determine, for each radio frequency (RF) signal, a likelihood that a carrier signal is associated with the RF signal;
express the likelihood that the carrier signal is associated with the RF signal as a set of carrier detection metrics;
combine the set of carrier detection metrics for each RF signal to produce a composite carrier detection metric representing a likelihood that the carrier signal is received; and
determine that the carrier signal is received based on the composite metric, wherein a received carrier signal is associated with a valid MIMO communication; and wherein:
the set of carrier metrics for each RF signal combine using logical operators to produce a binary signal detection value for each RF signal, and wherein the plurality of binary signal detection values for each RF signal combine using logical operators to produce the carrier detect.

15. The carrier detection module of claim 14, wherein the operational instructions are further operable to enable the processing module to:
determine the likelihood that the carrier signal is associated with the RF signal from the baseband signals;
determine the likelihood that the carrier signal is associated with the RF signal from intermediate frequency (IF) signals; or
determine the likelihood that the carrier signal is associated with the RF signal from the RF signal.

16. The carrier detection module of claim 15, wherein the carrier detection module is further operable to:
process the set of carrier detection metrics for each RF reception pathway to produce a binary signal detection value for each RF reception pathway, and wherein the plurality of binary signal detection values combine logically to produce the composite metric that comprises a logical decision based on the logically combined binary signal detection values and corresponds to carrier detection.

17. The carrier detection module of claim 15, wherein the set of carrier detection metrics for each RF reception pathway are combined arithmetically to produce the composite metric.

18. The carrier detection module of claim 14, wherein the set of carrier metrics for each RF signal combine using at least one of arithmetic and logical operators to produce a carrier detection metric for each RF signal, and wherein the plurality of carrier detection metric for each RF signal combine using the at least one of arithmetic and logical operators to produce the composite carrier detection metric.

19. The carrier detection module of claim 14, wherein:
the carrier detection module being implemented within a base station, an access point, a laptop computer host, a personal computer host, a cellular telephone host, or a personal digital assistant host.

20. The carrier detection module of claim 14, wherein the MIMO communication system supports packet based communications within a wireless local area network (WLAN).

21. A method operable to detect carrier signals within multiple radio frequency (RF) reception pathways of a multiple input multiple output (MIMO) communication system, comprising:
receiving multiple RF signals, wherein a RF signal is processed within each RF reception pathway;
determining, for each RF reception pathway, a likelihood that a carrier signal is associated with the processed RF signal;
expressing the likelihood that the carrier signal is associated with the RF signal as a set of carrier detection metrics for each RF reception pathway;
combining the set of carrier detection metrics for each RF reception pathway to produce a composite metric representing a likelihood that the carrier signal is received by the MIMO communication system; and
determining that the carrier signal is received by the MIMO communication system based on the composite metric; and wherein:
the set of carrier detection metrics for each RF reception pathway are combined arithmetically to produce the composite metric;
the set of carrier detection metrics for each RF reception pathway are processed to produce a binary signal detection value for each RF reception pathway, and wherein the plurality of binary signal detection values combine logically; and
the composite metric comprises a logical decision based on the logically combined binary signal detection values and corresponding to carrier detection.

22. A multiple input multiple output (MIMO) radio frequency (RF) receiver operable to receive a MIMO communication comprising a plurality of RF signals, comprising:
a plurality of RF receiver sections each operable to receive an RF signal and produce a baseband signal;
a plurality of baseband processing modules operably coupled to the plurality of RF receiver sections, wherein the baseband processing modules are operable to convert the plurality of baseband signals into data when the MIMO communication is a valid packet communication; and
a carrier detection module operably coupled to the plurality of RF receiver sections, wherein the carrier detection module is operable to:
determine, for each RF signal, a likelihood that a carrier signal is associated with the RF signal;
express the likelihood that the carrier signal is associated with the RF signal as a set of carrier detection metrics;

combine the set of carrier detection metrics for each RF signal to produce a composite metric representing a likelihood that the carrier signal is received; and determine that the carrier signal is received based on the composite metric, wherein a received carrier signal is associated with a valid MIMO communication; and wherein:

the set of carrier detection metrics for each RF reception pathway are processed to produce a binary signal detection value for each RF reception pathway;

the set of carrier detection metrics for each RF reception pathway are combined arithmetically, wherein the arithmetically combined sets of carrier detection metrics are used to produce a composite binary signal detection value;

the binary signal detection value for each RF reception pathway and composite binary signal detection value combine to produce the carrier detection.

23. A carrier detection module for a multiple input multiple output (MIMO) communication system, comprising:

a processing module; and memory operably coupled to the processing module, wherein the memory stores operational instructions that enable the processing module to:

determine, for each radio frequency (RF) signal, a likelihood that a carrier signal is associated with the RF signal;

express the likelihood that the carrier signal is associated with the RF signal as a set of carrier detection metrics;

combine the set of carrier detection metrics for each RF signal to produce a composite carrier detection metric representing a likelihood that the carrier signal is received; and determine that the carrier signal is received based on the composite metric, wherein a received carrier signal is associated with a valid MIMO communication; and wherein:

the operational instructions are further operable to enable the processing module to:

determine the likelihood that the carrier signal is associated with the RF signal from the baseband signals;

determine the likelihood that the carrier signal is associated with the RF signal from intermediate frequency (IF) signals; or determine the likelihood that the carrier signal is associated with the RF signal from the RF signal; and the carrier detection module is further operable to process the set of carrier detection metrics for each RF reception pathway to produce a binary signal detection value for each RF reception pathway, and wherein the plurality of binary signal detection values combine logically to produce the composite metric that comprises a logical decision based on the logically combined binary signal detection values and corresponds to carrier detection.

\* \* \* \* \*

UNITED STATES PATENT AND TRADEMARK OFFICE
CERTIFICATE OF CORRECTION

PATENT NO.         : 7,792,227 B2
APPLICATION NO.    : 11/132939
DATED              : September 7, 2010
INVENTOR(S)        : R. Tushar Moorti et al.

It is certified that error appears in the above-identified patent and that said Letters Patent is hereby corrected as shown below:

On the Title Page, Item (74): The attorney name should appear as follows: "Robert A. McLauchlan, III"

Signed and Sealed this
Twenty-fourth Day of April, 2012

David J. Kappos
*Director of the United States Patent and Trademark Office*